United States Patent Office 3,705,243
Patented Dec. 5, 1972

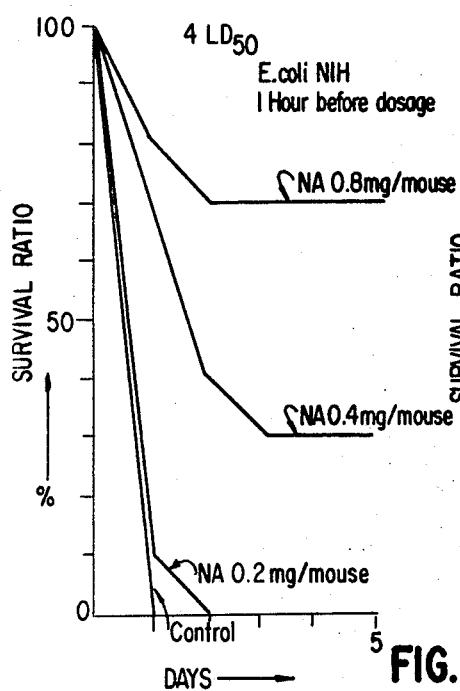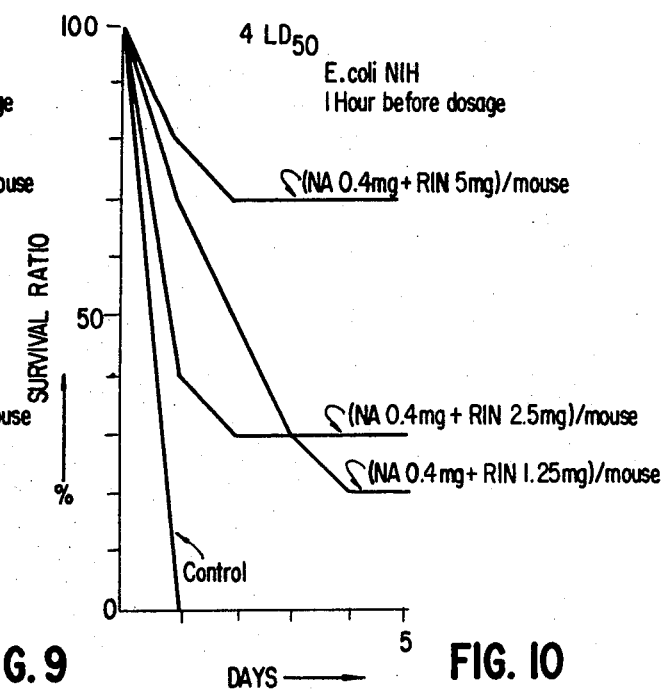
FIG. 9
FIG. 10
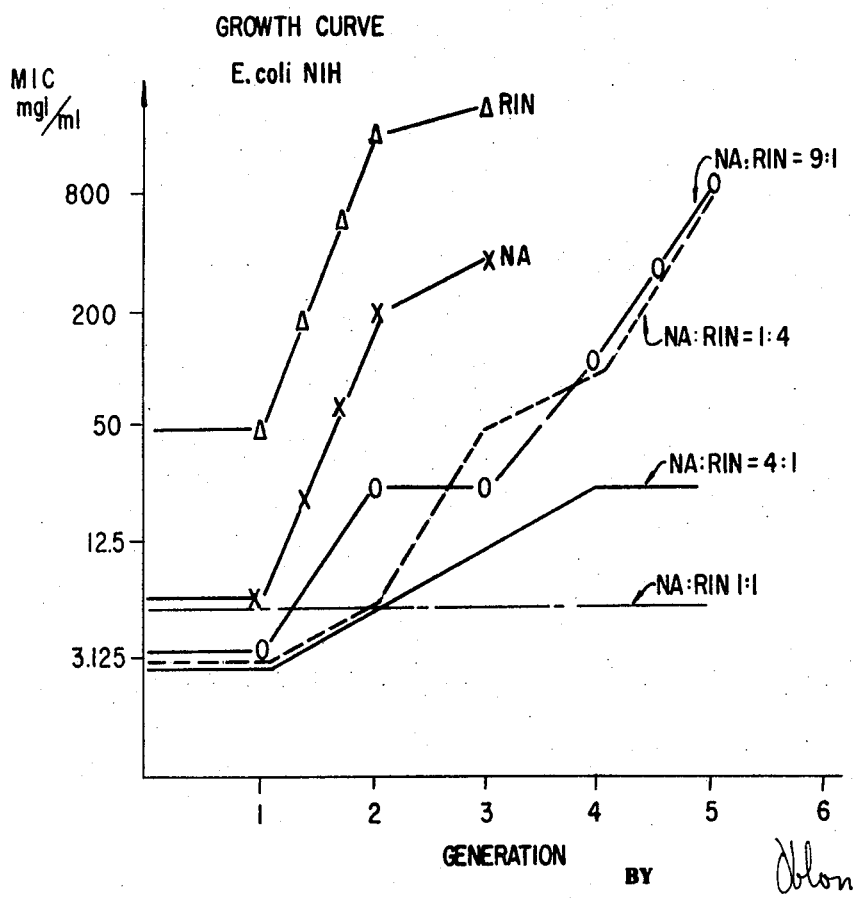
FIG. 11

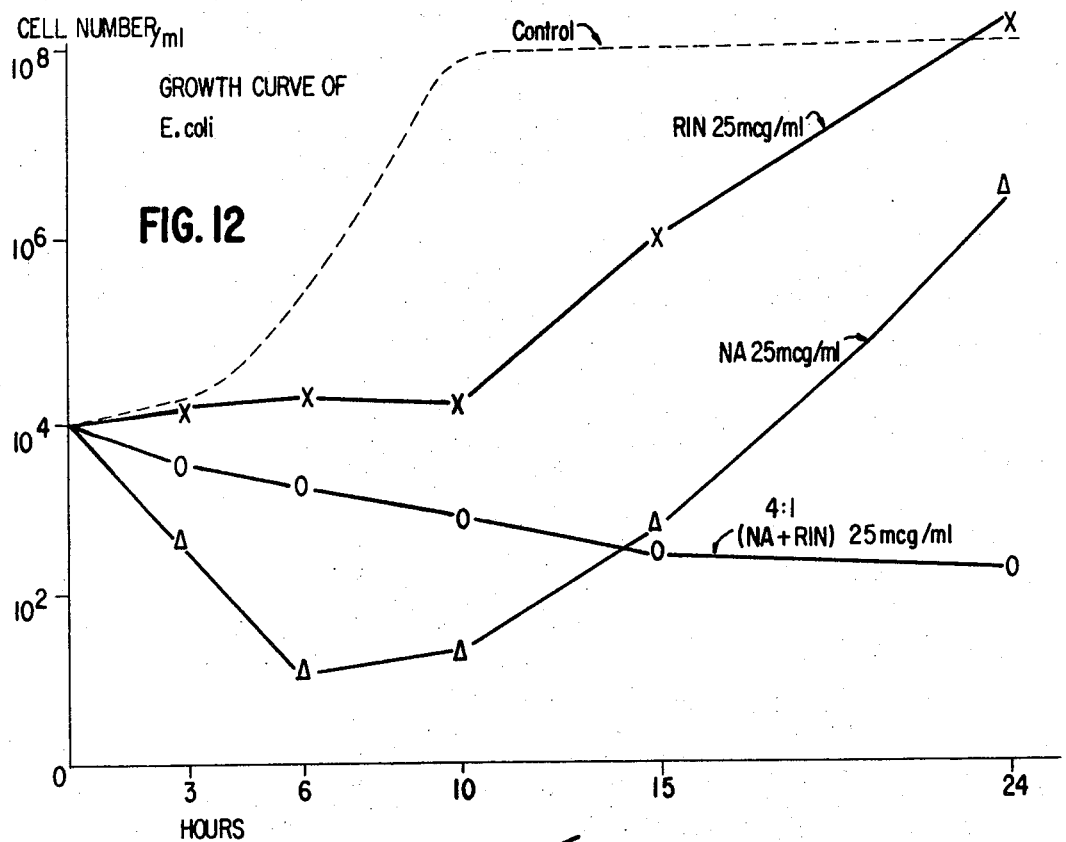
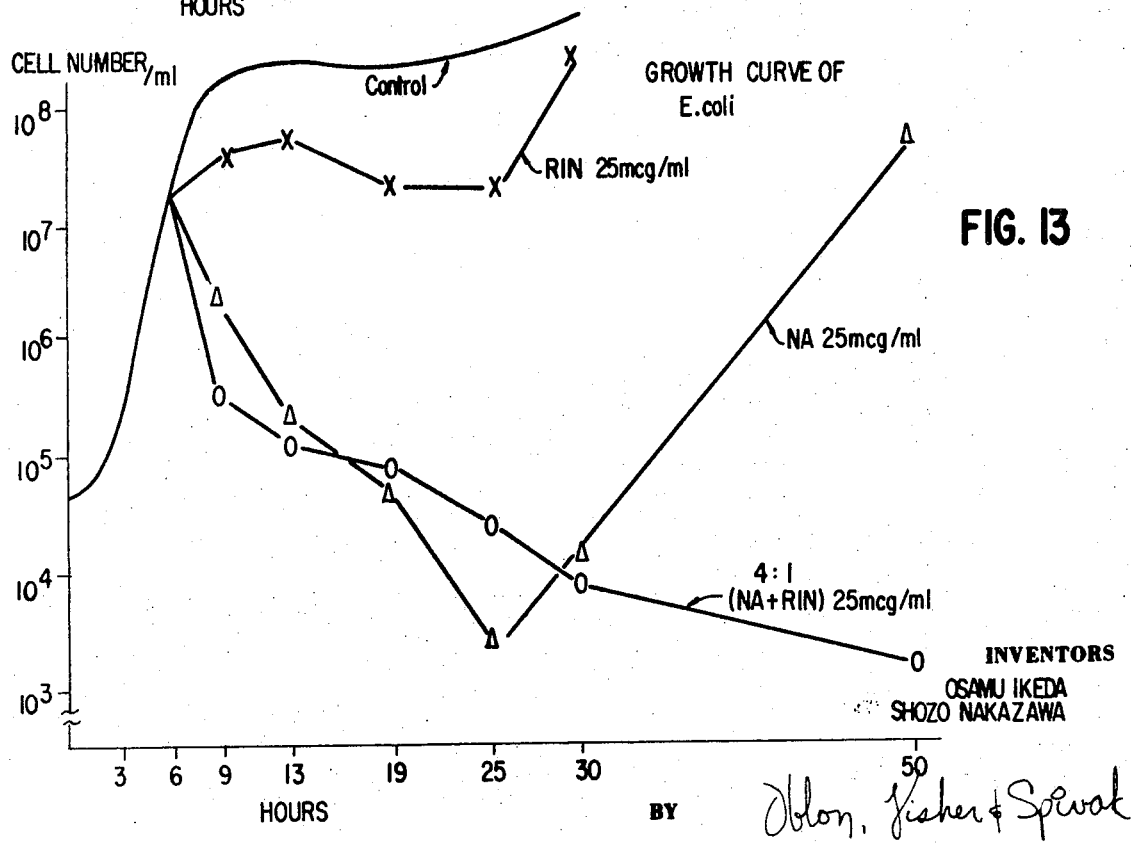

3,705,243
ANTIBACTERIAL COMPOSITION
Shozo Nakazawa, Kyoto, and Osamu Ikeda, Tokyo, Japan, assignors to Daiichi Seiyaku Co., Ltd., Tokyo, Japan
Filed June 4, 1970, Ser. No. 43,396
Claims priority, application Japan, June 4, 1969, 44/43,230
Int. Cl. A61k 27/00
U.S. Cl. 424—250          8 Claims

ABSTRACT OF THE DISCLOSURE

An antibacterial composition containing from 0.5 to 10 parts by weight nalidixic acid per part by weight of rifampicin shows synergistically enhanced antibacterial activity while greatly reducing development of drug tolerance by the organisms being treated.

BACKGROUND OF THE INVENTION

Field of the invention

This invention relates to a chemotherapeutic composition containing nalidixic acid and rifampicin. More particularly, this invention relates to an antibacterial composition containing from 0.5 to 10 parts by weight nalidixic acid per part by weight of rifampicin which shows synergistically enhanced antibacterial activity over that of either compound used alone, and which retains its initial minimum inhibitory concentration without the development of drug tolerance by the organism being treated, even after repeated use. This invention also relates to a method for treating bacterial infections which comprises administering the above composition.

Description of the prior art

Nalidixic acid is a well-known synthetic bactericidal agent (1-ethyl-1,4-dihydro-7-methyl-4-oxo-1,8-naphthyridine-3-carboxylic acid) which is effective against gram-negative bacteria such as *Escherichia coli*, Proteus, Aerobacter, Klebsiella, and certain strains of Pseudomonas. Nalidixic acid is used frequently in the treatment of acute and chronic genito-urinary tract infections, which are frequently caused by *E. coli*. However, the bacteria being treated often develop a resistance to the drug or resistant organisms, not previously present or identified, may emerge.

Rifampicin is a natural antibiotic which has been used clinically in other countries and experimentally in the United States in treating acid-fast bacteria. It has been proposed for the treatment of tuberculosis and atypical mycobacteria, as well as for the eradication of meningococcal carriers. As with nalidixic acid, resistance to rifampicin usually develops rapidly, particularly with respect to *Staphylococcus aureus* and *Escherichia coli*. This rapid development of a tolerance to each of these drugs by the microorganisms to be treated has severely limited their effective use, particularly when the infections to be treated are of a nature requiring large or repeated dosages.

SUMMARY OF THE INVENTION

Without wishing to be bound by any particular theory of operation, the present inventors proposed that a combination of nalidixic acid and rifampicin might prevent drug tolerance from developing in microorganisms being treated, on the basis that the mechanism of the antibacterial effect of nalidixic acid is due to an inhibition of desoxyribonucleic acid (DNA) synthesis, while that of rifampicin is attributable to an inhibition of ribonucleic acid (RNA) synthesis in microorganisms.

Accordingly, it is an object of this invention to provide a new composition of antibacterial agents which exhibits an enhanced activity against either gram-positive or gram-negative organisms.

A further object of this invention is to provide a new composition of antibacterial agents which exhibit enhanced activity against both gram-positive and gram-negative organisms while minimizing the development of tolerance to the composition by the bacteria being treated.

Another object of this invention is to provide a new composition of antibacterial agents which is effective in treating *E. coli* infections while preventing the organism from developing a resistance to the composition.

Yet another object of this invention is to provide a composition of antibacterial agents which may be administered chemotherapeutically for the treatment of bacterial infections.

The foregoing and other objects are attained by providing a composition containing from 0.05 to 10 parts by weight nalidixic acid per part of rifampicin. As a result of studies both in vitro and in vivo, the present compositions have been developed which exhibit enhanced activity against gram-positive or gram-negative organisms without the development of tolerance to the composition by the organisms being treated.

BRIEF DESCRIPTIONS OF THE DRAWINGS

With these and other objects in view, as will hereinafter more fully appear, and which will be more particularly pointed out in the appended claims, reference is now made to the following description when taken in connection with the accompanying drawings, in which:

Figure 6:
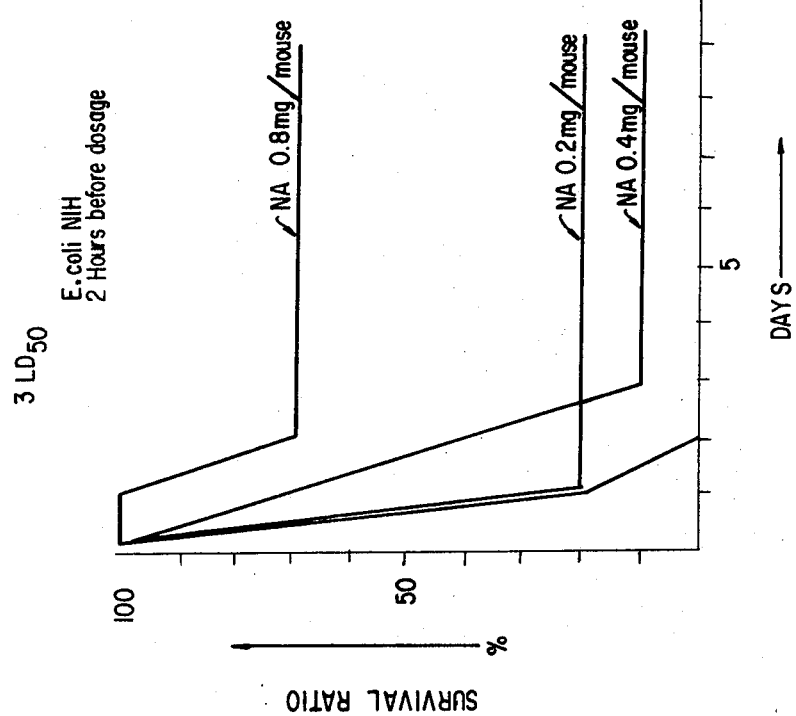
Figure 5:
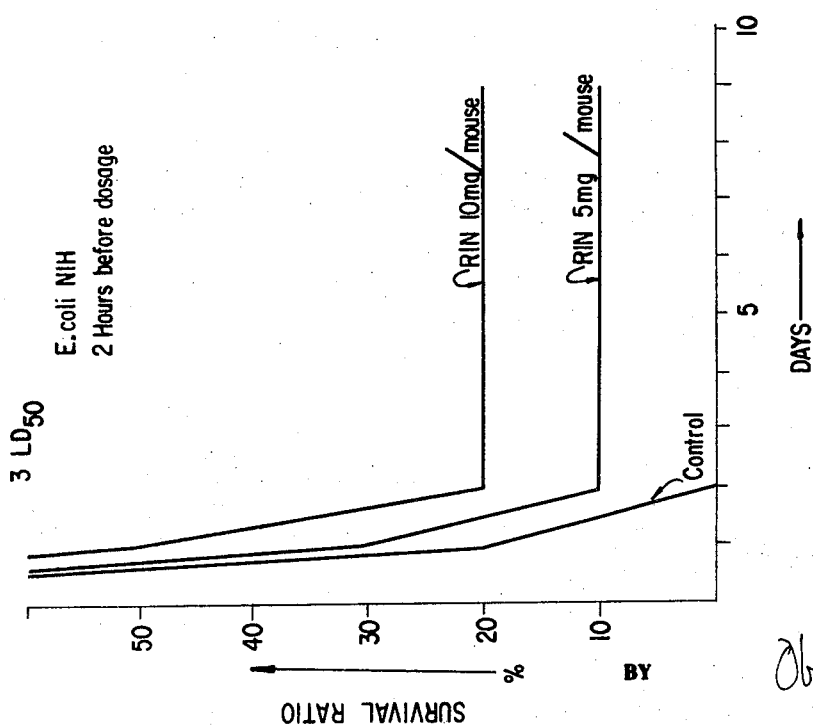
FIG. 5 is a plot of the survival ratio, expressed as a percentage of animals surviving versus the number days of survival for a group of mice which were intraperitoneally infected with three $LD_{50}$ dosages of *E. coli*, and then orally administered rifampicin two hours after infection.
Figure 7:
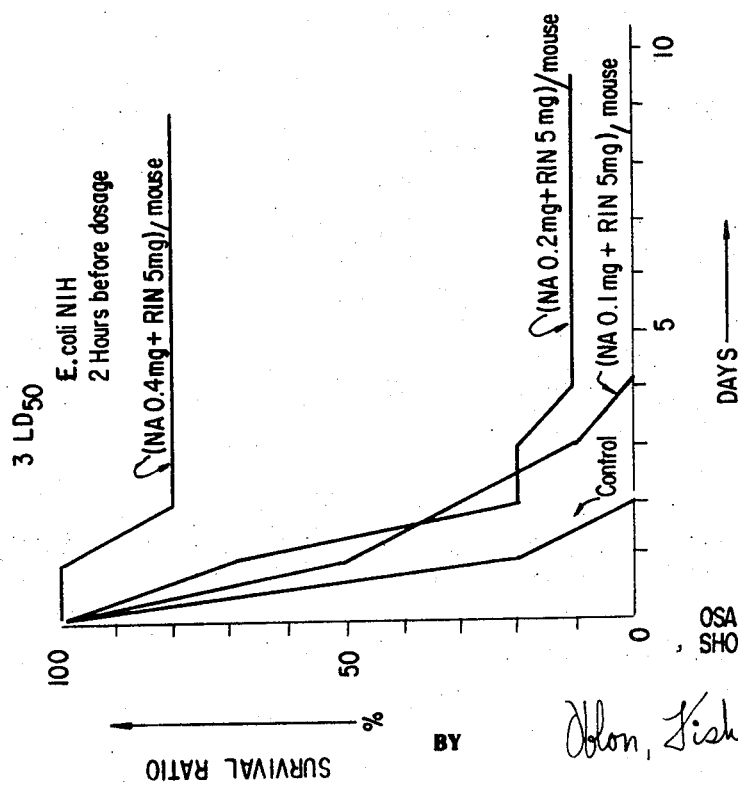

FIG. 6 expresses the same data for a group of animals which were orally administered naladixic acid;

FIG. 7 expresses the same data obtained from a group of animals which were administered a combination of naladixic acid and rifampicin in accordance with the present invention.

Figure 8:
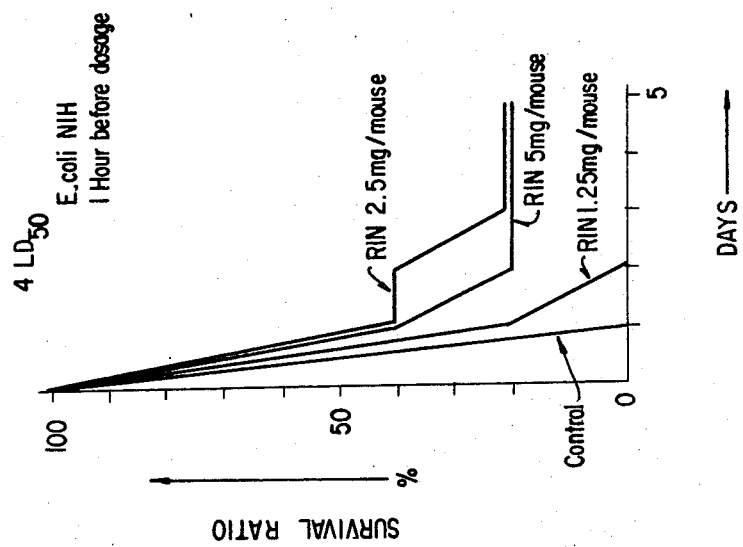

FIG. 8 shows the same type of a curve obtained from animals which were intraperitoneally injected with four $LD_{50}$ dosages of *E. coli*, and then orally given rifampicin in the indicated dosages one hour after inoculation;

FIG. 9 shows the similar data obtained when the animals are treated only with naladixic acid;

FIG. 10 shows similar data obtained by treating the animals with a combination of naladixic acid and rifampicin in accordance with the present invention;

FIG. 11 is a plot of minimum inhibitory concentrations of naladixic acid, rifampicin, or the combination of this invention, determined for each 24-hour generation of E. coli;

FIG. 12 is a growth curve of E. coli, obtained by plotting cell numbers estimated turbidimetrically each hour after inoculation into media containing 25 micrograms per ml. of naladixic acid, rifampicin, or the combination of this invention;

FIG. 13 shows the same results obtained when the drugs or the composition are added six hours after the initial inoculation.

DESCRIPTION OF ILLUSTRATIVE EMBODIMENTS

The enhanced or synergistic activity of the present composition was discovered with various microorganisms, for example, *Escherichia coli, Proteus vulgaris, Shigella dysenteriae, Salmonella typhi, Klebsiella pneumoniae*, etc.

The most remarkable case illustrating the synergistic activity of the present combination is seen with the *E. coli* NIH strain, as shown in Example 2 and illustrated in Table 1. In this example, the present composition containing naladixic acid and rifampicin in a ratio of 1 part naladixic acid to 8 parts rifampicin inhibited the growth of the organisms at a minimum inhibitory concentration (MIC) of only 0.39 microgram per milliliter, while the MIC obtained with either naladixic acid or rifampicin alone was 6.25 mcg./ml. and 100 mcg./ml., respectively. In the example using a composition containing from 1 to 4 parts naladixic acid per part of rifampicin (naladixic acid and rifampicin are hereinafter abbreviated: "NA" and "RIN," respectively), i.e., NA:RIN=1–4:1, the MIC of the composition was 0.78 mcg./ml. against *E. coli* NIH.

A remarkable prevention of developing drug tolerance has been accomplished with the present invention in various ratios of NA to RIN. As shown in Example 1 and illustrated in FIG. 2, for instance, a composition containing an equal amount of both NA and RIN still retains a MIC of 6.25 mcg./ml. even against the eighth generation of *E. coli* 0–55. This MIC is surprisingly lower than those obtained with either NA or RIN alone, i.e., ⅛ and ⅟₅₀₀, respectively.

Ratios of the two drugs showing these remarkable effects will generally range from 1 part NA to 0.05 to 10 parts of RIN, expressed as parts by weight. Obviously, the most suitable ratio will vary depending upon the particular species of organism, the particular host in which the organism is being treated, the total amount of the dosage, and other conditions which may readily be determined by those skilled in the art. According to our experimental results, the preferred combination ratio of NA to RIN in terms of weight percent generally falls in a range of from 0.08 to 0.2. The most useful ratio for the experiments disclosed herein is 1 part NA to 7 parts RIN.

The new composition of this invention can be applied either orally or parenterally, and the drugs can be used in combination with other medicaments or pharmaceutically acceptable carriers.

Having now generally described the invention, a further understanding can be obtained by reference to the following specific examples, which are presented for the purposes of illustration only and are not intended to limit the claims. Obvious modifications may be made by those skilled in the art.

Example 1.—Development of acquired resistance

One gram of RIN and one gram of NA, each in powder form, were mixed to form a composition. The minimum inhibitory concentration (MIC) of the composition was measured with respect to *E. coli* strains NIH–JC, JC–1, Ikaken, and 0–55, and *Proteus vulgaris* OX–19, and compared with those of NA or RIN alone. Incubation was at 37° C. using heart infusion bouillon media. The serial generation culture method was used, in which 24 hours' incubation was regarded as one generation of the organisms tested. As seen in FIGS. 1 through 4, the synergistic effect of the composition was found even in the first generation, and drug resistance to the composition developed quite slowly. For example, in FIG. 2, it can be seen that the MIC of the composition was only 6.25 mcg./ml. at the eighth generation, while the MIC of NA and RIN at the eighth generation reached 50 mcg./ml. and 3200 mcg./ml., respectively. Since MIC represents the minimum inhibitory concentration of the antibacterial compounds present, it is obvious that the lower value for this figure represents a more efficient antibacterial agent.

The same experiment as above was repeated using *Staphylococcus aureus* 209P–JC as the test bacteria. At the seventh generation, the MIC of the composition was 3.125 mcg./ml., while that of NA alone was 200 mcg./ml. and that of RIN alone was 6.25 mcg./ml. These values indicate that *Staphylococcus aureus*, as well as *E. coli*, have difficulty in developing a resistance to this composition.

Example 2.—In vitro synergistic effects

Figure 1:
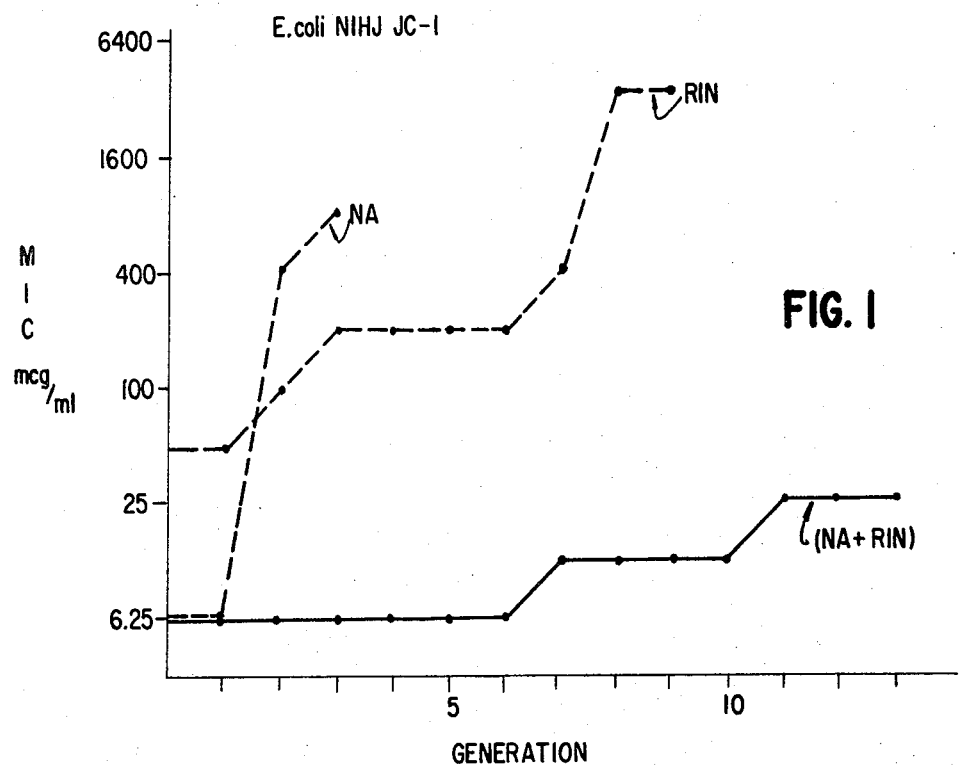
FIG. 1 shows the continued effectiveness of the composition of the present invention against *E. coli*, plotted in terms of Minimum Inhibitory Concentration versus Generation Number, and compared with nalidixic acid and rifampicin used individually.
Figure 2:
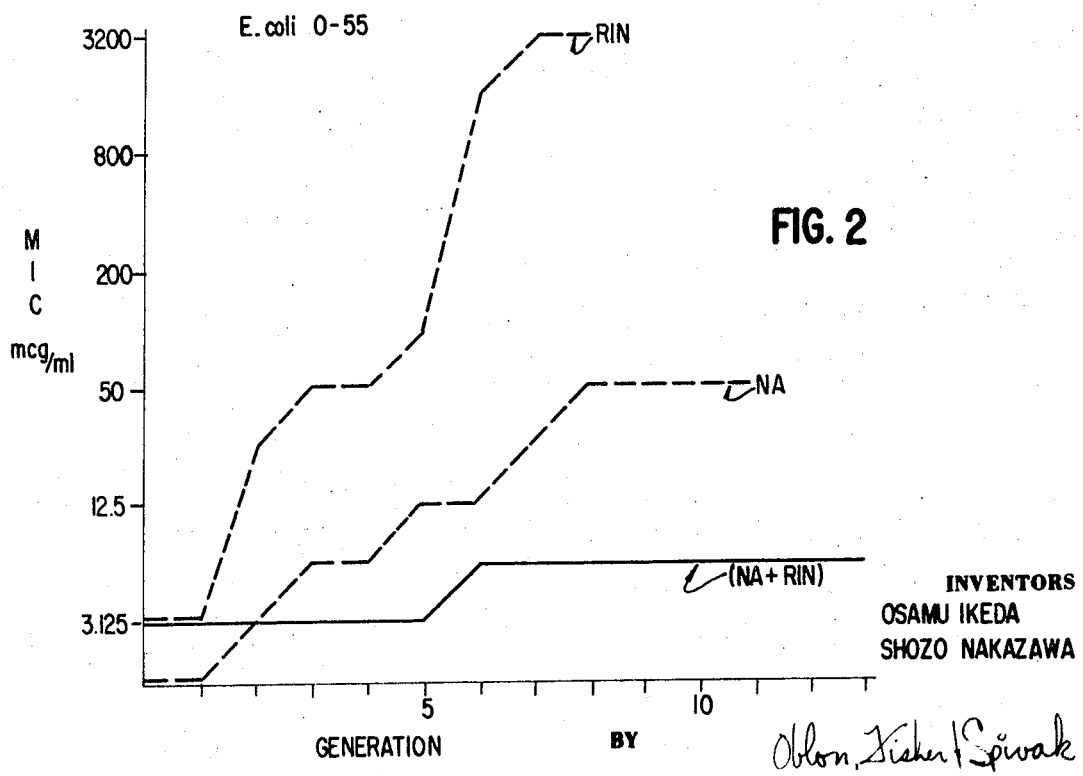
FIG. 2 shows the same sort of graph obtained against *E. coli* 0–55.
Figure 3:
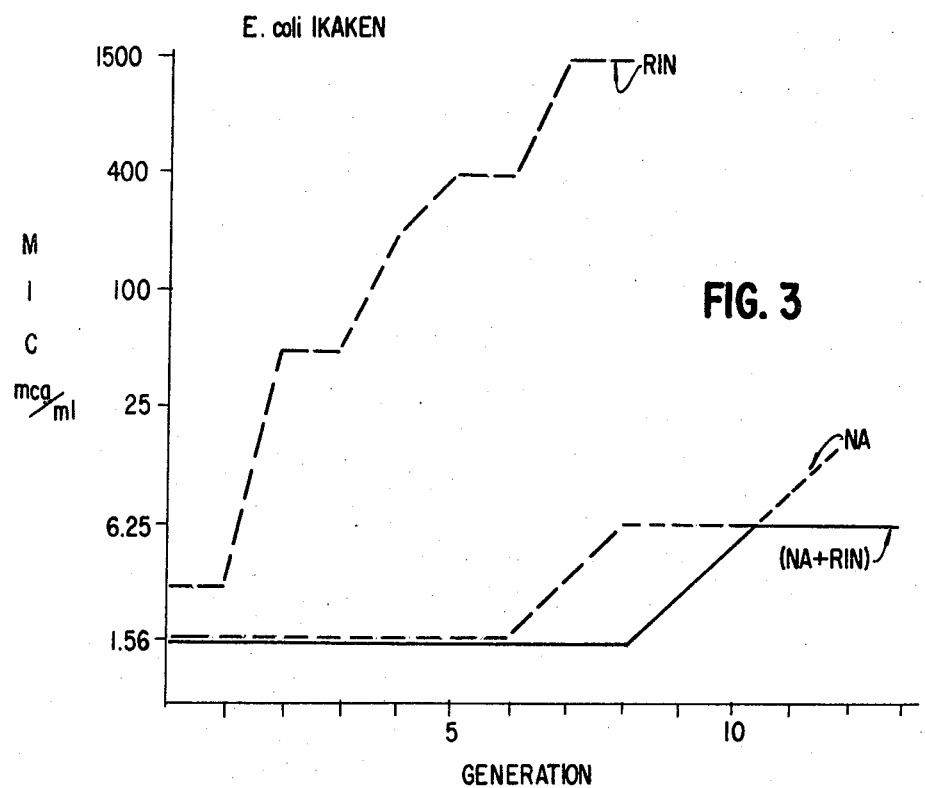
FIG. 3 shows the curve obtained against *E. coli* Ikaken.
Figure 4:
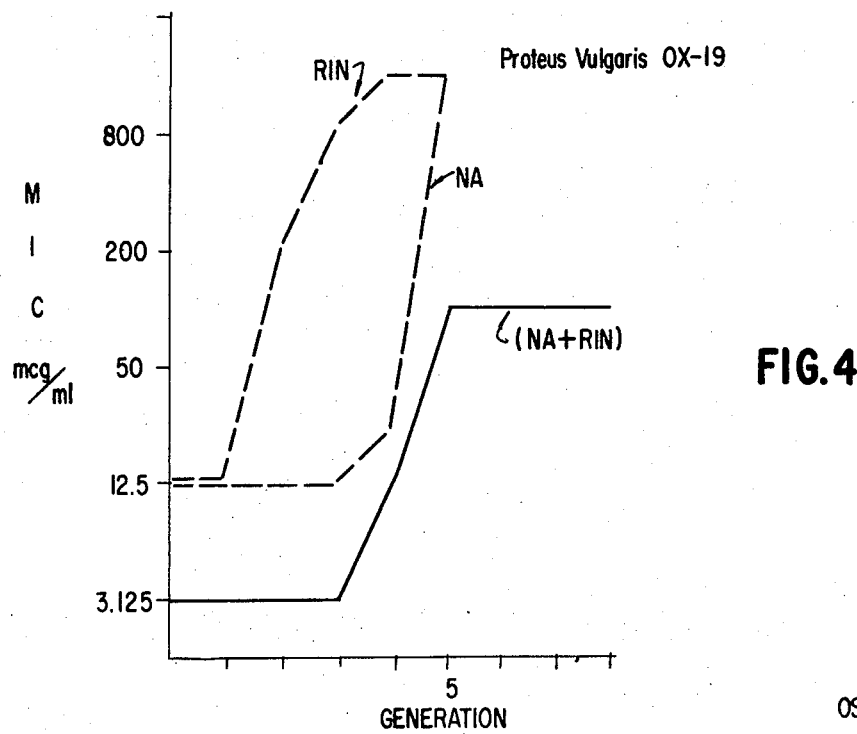
FIG. 4 shows a similar plot for the data obtained against *Proteus vulgaris* OX–19.

The synergistic effect between NA and RIN was investigated for both *E. coli* and *Proteus vulgaris* using the liquid dilution method. Incubation was carried out in heart infusion bouillon media at 37° C. for 24 hours. The results are shown in the following Tables I and II for *E. coli* and *Proteus vulgaries*, respectively. The MIC indicates the minimal concentration of the compounds which will inhibit growth of the organisms. As can be seen in Table I, the NA control had an MIC of 6.25 mcg./ml., while the RIN control had an MIC of almost 100 mcg./ml. In the composition of the present invention used against *E. coli*, an MIC was obtained with NA levels as low as 0.39 mcg./ml., and RIN levels as low as 0.78 mcg./ml. The same effect is evident in FIG. 2, showing the inhibition of the growth of *Proteus vulgaries*. These data indicate that a combination of NA with RIN shows a remarkably synergistic effect on these microorganisms.

TABLE I *E. coli* NIH

| NA | RIN MIC, mcg./ml. | | | | | | | | | NA control |
|---|---|---|---|---|---|---|---|---|---|---|
|  | 200 | 100 | 50 | 25 | 12.5 | 6.25 | 3.125 | .156 | 0.78 |  |
| MIC, mcg./ml.: | | | | | | | | | | |
| 100 | − | − | − | − | − | − | − | − | − | − |
| 50 | − | − | − | − | − | − | − | − | − | − |
| 25 | − | − | − | − | − | − | − | − | − | − |
| 12.5 | − | − | − | − | − | − | − | − | − | − |
| 6.25 | − | − | − | − | − | − | − | − | − | − |
| 3.125 | − | − | − | − | − | − | − | − | − | − |
| 1.56 | − | − | − | − | − | − | − | − | − | + |
| 0.78 | − | − | − | − | − | − | − | + | − | + |
| 0.39 | − | − | − | − | − | − | − | + | + | + |
| RIN control | − | − | + | + | + | + | + | + | + | + |

TABLE II

Proteus vulgaris OX-19

| NA | RIN MIC, mcg./ml. | | | | | | | | NA control |
|---|---|---|---|---|---|---|---|---|---|
| | 100 | 50 | 25 | 12.5 | 6.25 | 3.125 | 1.56 | 0.78 | 0.39 | |
| MIC, mcg./ml.: | | | | | | | | | | |
| 100 | − | − | − | − | − | − | − | − | − | − |
| 50 | − | − | − | − | − | − | − | − | − | − |
| 25 | − | − | − | − | − | − | − | − | − | − |
| 12.5 | − | − | − | − | − | − | − | − | − | − |
| 6.25 | − | − | − | − | − | − | − | − | − | − |
| 3.125 | − | − | − | − | − | − | − | − | + | + |
| 1.56 | − | − | − | − | − | − | ± | + | + | + |
| 0.78 | − | − | − | − | − | ± | + | + | + | + |
| 0.39 | − | − | − | − | ± | + | + | + | + | + |
| RIN control | − | − | − | + | + | + | + | + | + | + |

Example 3.—Chemotherapeutic effects on mice experimentally infected with *E. coli.*

In order to determine the in vivo effects of the combination of this invention, groups of 10 mice each were treated with NA, RIN, or mixtures of the two in various ratios suspended in 0.5% carboxymethylcellulose (CMC). The dd-strain of mice having a body weight of 19±1 gram were used. Each mouse was infected intraperitoneally with a dosage of 3 or 4 $LD_{50}$ of *E. coli* NIH in combination kith 3% mucin. One or two hours after the injection, the suspension of NA, RIN, or mixture of the two in carboxymethylcellulose was administered orally to the infected mice. The effect on prolonging the survival time of the mice was examined and compared with a control group. The results are shown in FIGS. 5 through 10. The data shown in FIGS. 5, 6 and 7 were obtained by administering the drugs two hours after an infection caused by 3 times the $LD_{50}$ of *E. coli*, while the data in FIGS. 8, 9 and 10 correspond to the same results obtained from administering the drug one hour after an infection caused by a four-fold $LD_{50}$ dosage. As can be seen from FIG. 5, only 10 to 20 percent of the infected mice which were treated with 5 to 10 milligrams of RIN managed to survive. From FIG. 6, it can be seen that from 10 to 70 percent of the infected mice treated with between 0.4 mg. and 0.8 mg. of NA survived at the end of 10 days. In FIG. 7, a combination of 0.4 mg. NA and 5 mg. RIN per mouse resulted in an 80 percent survival rate, as compared with only a 10 percent survival rate when 0.4 mg. of NA alone were administered, and only a 10 percent survival rate when 5 mg. of RIN alone were administered. In the second series of experiments, FIG. 8 illustrates that only 20 percent of the mice survived when treated with dosages of 2.5 to 5 mg. per mouse of RIN. Similarly, 30 to 70 percent of the mice treated with 0.4 to 0.8 mg. of NA survived at the end of 5 days. These mice treated with the combination of NA and RIN showed a 70 percent survival ratio at dosages of 0.4 mg. of NA and 5 mg. of RIN, compared to the 30 percent survival ratio for those receiving only 0.4 mg. NA, and the 20 percent survival ratio for those receiving only 5 mg. of RIN. Thus, the remarkable synergistic effects of the composition of the present invention are shown in in vivo as well as in vitro experiments.

Example 4

In order to determine the optimum ratios of Na to RIN, suspensions containing various ratios of NA to RIN and 0.5% carboxymethylcellulose were prepared. The mice were infected with a three-fold $LD_{50}$ dosage of *E coli* NIH by intraperitoneal injection. The suspension was administered to the mice and its effectiveness measured in the same manner as in Example 3. The results, expressed in terms of survival ratio, are shown in the following Table III.

TABLE III

Survival Ratios (*E.coli* NIH)

| Ratio of NA:RIN | Total drug dosage (mg./mouse) | | |
|---|---|---|---|
| | 1 | 0.5 | 0.25 |
| 10:0 | 0 | 0 | 0 |
| 9:1 | 12.5 | 12.5 | 0 |
| 4:1 | 12.5 | 25 | 0 |
| 2:1 | 12.5 | 0 | 0 |
| 1:1 | 75 | 25 | 0 |
| 1:2 | 100 | 87.5 | 0 |
| 1:4 | 100 | 75 | 12.5 |
| 1:9 | 100 | 87.5 | 12.5 |
| 0:10 | 87.5 | 75 | 0 |

Example 5

Using a five-fold $LD_{50}$ dosage of *Staphylococcus aureus* 50774 as the test bacteria, the experiment of Example 4 was repeated. The results are shown in Table IV.

TABLE IV

Survival Ratios (*Straph. aureus* 50774)

| Ratio of NA:RIN | Total drug dosage (mg./mouse) | | |
|---|---|---|---|
| | 0.02 | 0.01 | 0.005 |
| 10:0 | 87.5 | 0 | 0 |
| 9:1 | 100 | 50 | 12.5 |
| 4:1 | 100 | 37.5 | 12.5 |
| 2:1 | 100 | 0 | 0 |
| 1:1 | 75 | 12.5 | 0 |
| 1:2 | 25 | 0 | 0 |
| 1:4 | 12.5 | 0 | 0 |
| 1:9 | 0 | 0 | 0 |
| 0:10 | 0 | 0 | 0 |

Example 6

In order to measure the development of resistance acquired by *E. coli* NIH against the various ratios of NA and RIN in the composition of the present invention, the MIC at each generation was determined for *E. coli* in the same manner as in Example 1. The values are plotted in FIG. 11. It can be seen that the ability of the bacteria to develop a resistance to the composition depends somewhat on the relative amounts of each component in the composition. However, in all cases tested, the resistance of the bacteria to the composition of this invention was markedly lower than the tolerance developed to either of the components individually.

Example 7

In order to determine whether the synergistic effects of the composition having a ratio of NA to RIN of 4 to 1 were achieved with different organisms, the MIC for this composition was determined against a wide number of microorganisms in the same manner as in Example 2. The results are shown in Table V.

TABLE V

Minimum Inhibitory Concentrations NA to RIN=4:1

| Microorganisms tested | NA | RIN | Composition (NA/RIN=4) |
|---|---|---|---|
| Staph. aureus 209P JC | >100 | 0.006 | 0.025 |
| Staph. aureus terailma | >100 | 0.012 | 0.025 |
| B. subtilis PCN 291 | 0.4 | 0.05 | 0.4 |
| E. coli NIH | 3.12 | 12.5 | 1.56 |
| Aerobacter aerogenes | 25 | 25 | 12.5 |
| Salmonella typhosa T-287 | 3.12 | 12.5 | 3.12 |
| Salmonella enteritidis | >100 | >100 | 50 |
| Shigela dysenteriae EW-7 | 6.25 | 6.25 | 6.25 |
| Shigella flexneri Komagome | 3.12 | 6.25 | 3.12 |
| Pseudomonas aeruginosa No. 12 | >100 | >100 | >100 |
| Proteus vulgaris OX-19 | 12.5 | 25 | 6.25 |

It can be seen from the above that the MIC of the combination in this invention is at least as low as the MIC of either component when used individually, and often lower than either of the components when used individually.

Example 8

This experiment was run to determine the effects of the composition having a ratio of NA to RIN of 4:1 on a growth curve of E. coli NIH. At the initial stage of culturing E. coli at 37° C. in heart infusion bouillon media, NA, RIN, or a composition of NA to RIN=4:1 was added to give a concentration of 25 mcg./ml. prior to incubation. Progress of cell growth was measured turbidimetrically, and the experimental results are shown in FIG. 12. It can be seen that after 24 hours the growth curve in the presence of the composition of this invention is still headed downward, indicating that the bactericidal effects of the components are unhindered, while the growth curve of E. coli in equivalent concentrations of either NA or RIN alone is rapidly approaching that of the control, to which no inhibitor has been added. FIG. 13 shows the same results when the drugs or the composition are added 6 hours after initial cultivation. Only when the two components are present together do they retain their bactericidal activity.

Having thus described the invention, it should be understood that the foregoing disclosure relates only to illustrative embodiments of the invention and that numerous modifications or alterations may be made therein by those skilled in the art without departing from the spirit or scope of the invention as set forth in the appended claims.

Accordingly, what is claimed as new and desired to be secured by Letters Patent is:

1. An antibacterial composition comprising nalidixic acid and rifampicin in the ratio of from about 0.5 to about 9 parts by weight nalidixic acid per part by weight of rifampicin.

2. The composition of claim 1 containing from about 1 to about 9 parts by weight naladixic acid per part by weight of rifampicin.

3. The composition of claim 1 containing about 4 parts by weight nalidixic acid per part by weight of rifampicin.

4. A method for treating bacterial infections in an animal which comprises administering to said animal an effective antibacterial amount of a composition comprising nalidixic acid and rifampicin in the ratio of from about 0.5 to about 9 parts by weight nalidixic acid per part by weight of rifampicin.

5. The method of claim 4 in which the composition is administered orally.

6. The method of claim 4 in which the composition is administered parenterally.

7. The method of claim 4 in which the composition contains from about 1 to about 9 parts by weight nalidixic acid per part by weight of rifampicin.

8. The method of claim 4 in which the composition contains about 4 parts by weight nalidixic acid per part by weight of rifampicin.

References Cited

Chemical Abstracts 68: 94475n (1968).
The Merck Index, 1968, 8th edition, p. 711.

JEROME D. GOLDBERG, Primary Examiner

U.S. Cl. X.R.

424—263